(12) United States Patent
Stavova et al.

(10) Patent No.: US 11,576,391 B2
(45) Date of Patent: Feb. 14, 2023

(54) METHOD AND SYSTEM OPERATING A CONTROLLED ATMOSPHERE SYSTEM

(71) Applicant: THERMO KING LLC, Minneapolis, MN (US)

(72) Inventors: Petra Stavova, Beroun (CZ); Jiri Zita, Jedovnice (CZ); Martin Vojik, Prague (CZ); Michal Kolda, Prague (CZ)

(73) Assignee: THERMO KING LLC, Minneapolis, MN (US)

( * ) Notice: Subject to any disclaimer, the term of this patent is extended or adjusted under 35 U.S.C. 154(b) by 134 days.

(21) Appl. No.: 16/730,240

(22) Filed: Dec. 30, 2019

(65) Prior Publication Data

US 2020/0205429 A1 Jul. 2, 2020

(30) Foreign Application Priority Data

Dec. 30, 2018 (EP) ..................................... 18215923

(51) Int. Cl.
*A23L 3/34* (2006.01)
*A23B 7/14* (2006.01)
(Continued)

(52) U.S. Cl.
CPC ............ *A23B 7/148* (2013.01); *A23L 3/3418* (2013.01); *B01D 2256/10* (2013.01); *F24F 11/30* (2018.01);
(Continued)

(58) Field of Classification Search
CPC ...... F24F 2110/70; F24F 2110/76; F24F 8/60; F25D 11/003; A23L 3/3418;
(Continued)

(56) References Cited

U.S. PATENT DOCUMENTS 3,960,519 A 6/1976 Ebeling et al.
4,817,391 A 4/1989 Roe et al.
(Continued)

FOREIGN PATENT DOCUMENTS

DE 19513909 9/1996
EP 0294036 12/1988
(Continued)

OTHER PUBLICATIONS

European Search Report, cited in the European Patent Application No. 18215923.6, dated Jul. 22, 2019, 7 pages.

*Primary Examiner* — Jerry-Daryl Fletcher
*Assistant Examiner* — Daniel C Comings
(74) *Attorney, Agent, or Firm* — Hamre, Schumann, Mueller & Larson, P.C.

(57) ABSTRACT

A method is provided for operating a controlled atmosphere (CA) system to regulate the atmosphere in a cargo storage space. The CA system comprises a gas exchange module operable to vary the level of a component gas in the cargo storage space, a control module to control operation of the gas exchange module, and at least one of an oxygen sensor and a carbon dioxide sensor, each being operable to measure a parameter indicative of a level of oxygen or carbon dioxide respectively in the cargo storage space. The method comprises: the control module determining a respiration parameter value indicative of the rate of change of oxygen level and/or the rate of change of carbon dioxide level in the cargo storage space due to respiration of goods in the cargo storage space; and the control module controlling operation of the gas exchange module based on the determined respiration parameter value to target an oxygen level setpoint and/or a carbon dioxide level setpoint.

14 Claims, 6 Drawing Sheets

(51) Int. Cl.
*A23B 7/148* (2006.01)
*A23L 3/3418* (2006.01)
*F24F 110/20* (2018.01)
*F24F 110/70* (2018.01)
*F24F 110/76* (2018.01)
*F24F 11/30* (2018.01)
*F25D 11/00* (2006.01)

(52) U.S. Cl.
CPC ....... *F24F 2110/20* (2018.01); *F24F 2110/70* (2018.01); *F24F 2110/76* (2018.01); *F25D 11/003* (2013.01)

(58) Field of Classification Search
CPC ..... A23L 3/2418; A23L 3/3445; A23B 7/148; A23B 7/152; A23B 6/20
USPC ........................................................... 62/78
See application file for complete search history.

(56) References Cited

U.S. PATENT DOCUMENTS

| | | | |
|---|---|---|---|
| 4,829,774 A | 5/1989 | Wassibauer et al. | |
| 4,833,892 A | 5/1989 | Wassibauer et al. | |
| 4,896,514 A | 1/1990 | Sugiyama et al. | |
| 4,961,322 A | 10/1990 | Oguma et al. | |
| 5,120,329 A | 6/1992 | Sauer et al. | |
| 5,152,966 A | 10/1992 | Roe et al. | |
| 5,156,009 A | 10/1992 | Woodruff | |
| 5,244,363 A | 9/1993 | Olson | |
| 5,332,547 A | 7/1994 | Olson et al. | |
| 5,438,841 A | 8/1995 | Cahill-O'Brien et al. | |
| 5,451,248 A | 9/1995 | Sadkowski et al. | |
| 5,457,963 A | 10/1995 | Cahill-O'Brien et al. | |
| 5,515,693 A | 5/1996 | Cahill-O'Brien et al. | |
| 5,649,995 A | 7/1997 | Gast, Jr. | |
| 5,781,236 A | 7/1998 | Shinbori et al. | |
| 5,887,439 A | 3/1999 | Kotliar | |
| 6,007,603 A | 12/1999 | Garrett | |
| 6,460,352 B1 | 10/2002 | Lemcoff et al. | |
| 6,615,908 B1 | 9/2003 | Bosher et al. | |
| 8,252,090 B2 | 8/2012 | Haggerty et al. | |
| 9,034,405 B2 | 5/2015 | Clarke | |
| 9,121,634 B2 | 9/2015 | Rogers et al. | |
| 10,905,994 B2 * | 2/2021 | Zita | F25D 11/003 |
| 2004/0033162 A1 | 2/2004 | Kunstadt et al. | |
| 2005/0235658 A1 | 10/2005 | Fleming, Jr. et al. | |
| 2006/0199267 A1* | 9/2006 | Savur | G05D 11/138 436/55 |
| 2013/0013099 A1 | 1/2013 | Delele et al. | |
| 2013/0019961 A1 | 1/2013 | Rogers et al. | |
| 2015/0344209 A1* | 12/2015 | Savur | B65D 81/2069 426/118 |
| 2017/0112171 A1 | 4/2017 | Cermak et al. | |
| 2017/0127705 A1 | 5/2017 | Cermak et al. | |
| 2017/0355518 A1* | 12/2017 | Zita | A23B 7/148 |
| 2020/0113199 A1* | 4/2020 | Schaefer | A23B 7/148 |
| 2020/0205447 A1 | 7/2020 | Stavova et al. | |

FOREIGN PATENT DOCUMENTS

| | | |
|---|---|---|
| EP | 0749692 | 12/1996 |
| KR | 200142792 | 6/1999 |
| WO | 91/15719 | 10/1991 |
| WO | 2016/037043 | 3/2016 |
| WO | 2017/198793 | 11/2017 |
| WO | 2018/102934 | 6/2018 |
| WO | 2018/166713 | 9/2018 |

* cited by examiner

| | CO₂ level | | | |
|---|---|---|---|---|
| O₂ level | Below SP range | In SP range | Above SP range | Above maximum level |
| Below minimum level | Ventilation | Ventilation | Ventilation | Ventilation |
| Below SP range | Circulation | Ventilation | Ventilation | Ventilation |
| In SP range | Circulation | Circulation | Ventilation | Ventilation |
| Above SP range | Circulation | RP=R1; First N₂ mode | RP=R1; First N₂ mode | Ventilation |
| | | RP=R2; Second N₂ mode | RP=R2; Second N₂ mode | |
| | | RP=R3; Third N₂ mode | RP=R3; Ventilation | |

Fig. 7

| | | O₂ level | | |
|---|---|---|---|---|
| CO₂ level | | Below minimum level | Below SP range | In SP range | Above SP level |
| | Below SP range | Ventilation | Ventilation | Circulation | First N₂ mode |
| | In SP range | Ventilation | Ventilation | Circulation | First N₂ mode |
| | Above SP range | Ventilation | Ventilation | RP=R1; Circulation / RP=R2; Circulation / RP=R3; Second N₂ mode | First N₂ mode |
| | Above maximum level | Ventilation | Ventilation | Ventilation | Ventilation |

Fig. 8

METHOD AND SYSTEM OPERATING A CONTROLLED ATMOSPHERE SYSTEM

FIELD

The present disclosure concerns controlled atmosphere systems and methods of operating controlled atmosphere systems.

BACKGROUND

Perishable goods, such as fruits and vegetables, are often transported over long distances in freight containers. Perishable goods also tend to respire aerobically during transport, consuming oxygen in the container and generating carbon dioxide. Controlled atmosphere systems are used in freight containers to regulate the composition of the atmosphere in an attempt to control respiration of the goods and thereby control the natural ripening process as well as the resultant shelf-life of the goods. Controlled atmosphere systems are commonly combined with refrigeration systems, since ripening is typically suppressed at low temperatures.

Passive controlled atmosphere systems make use of carbon dioxide removal modules to reduce the level of carbon dioxide in a container. However, passive controlled atmosphere systems are, by definition, unable to reduce the level of oxygen in a container. Active controlled atmosphere systems are known which can be used to reduce oxygen levels. However, existing controlled atmosphere systems are generally inflexible and are not suitable for use in transporting a range of different types of goods which have different requirements for achieving optimum timing of ripening and optimum shelf-life.

SUMMARY OF INVENTION

According to a first aspect, there is provided a method of operating a controlled atmosphere (CA) system to regulate the atmosphere in a cargo storage space. The CA system comprises a gas exchange module operable to vary the level of a component gas in the cargo storage space, a control module to control operation of the gas exchange module, and at least one of an oxygen sensor and a carbon dioxide sensor, each being operable to measure a parameter indicative of a level of oxygen or carbon dioxide respectively in the cargo storage space. The method comprises: the control module determining a respiration parameter value indicative of the rate of change of oxygen level and/or the rate of change of carbon dioxide level in the cargo storage space due to respiration of goods in the cargo storage space; and the control module controlling operation of the gas exchange module based on the determined respiration parameter value to target an oxygen level setpoint and/or a carbon dioxide level setpoint.

Use of the respiration parameter value in the control of the gas exchange modules enables atmospheric conditions inside the cargo storage space to be more accurately tailored to the goods being stored therein, particularly when those goods respire aerobically such they cause changes in the levels of oxygen and carbon dioxide in the cargo storage space. This enables the cargo storage space to be used to store different types of goods which respire at different rates, while achieving improved control of ripening or shelf-life.

The oxygen level may be a measure of the amount of oxygen (i.e. $O_2$) in the atmosphere in the cargo storage space. For example, the oxygen level may be the concentration of oxygen in the atmosphere in the cargo storage space. The concentration of a gas component is the amount, such as the mass or number of moles, of that component per unit volume of gas. Alternatively, the oxygen level may be the partial pressure of oxygen in the atmosphere in the cargo storage space. The partial pressure of a gas component in a mixture of gases is the notional pressure of the gas component if it alone occupies the entire volume of the mixture at the same temperature.

The carbon dioxide level may be a measure of the amount of carbon dioxide (i.e. $CO_2$) in the atmosphere in the cargo storage space. For example, the carbon dioxide level may be the concentration of carbon dioxide in the atmosphere in the cargo storage space. Alternatively, the carbon dioxide level may be the partial pressure of carbon dioxide in the atmosphere in the cargo storage space.

The parameter indicative of the level of oxygen in the cargo storage space may be the level of oxygen in the cargo storage space. Alternatively, the parameter indicative of the level of oxygen in the cargo storage space may be related to (e.g. dependent on) the level of oxygen in the cargo storage space. For example, the parameter indicative of the level of oxygen in the cargo storage space may be proportional to the level of oxygen in the cargo storage space. Alternatively, the parameter indicative of the level of oxygen in the cargo storage space may be some other function, e.g. an exponential, logarithmic or trigonometric function, of the level of oxygen in the cargo storage.

The parameter indicative of the level of carbon dioxide in the cargo storage space may be the level of carbon dioxide in the cargo storage space. Alternatively, the parameter indicative of the level of carbon dioxide in the cargo storage space may be related to (e.g. dependent on) the level of carbon dioxide in the cargo storage space. For example, the parameter indicative of the level of carbon dioxide in the cargo storage space may be proportional to the level of carbon dioxide in the cargo storage space. Alternatively, the parameter indicative of the level of carbon dioxide in the cargo storage space may be some other function, e.g. an exponential, logarithmic or trigonometric function, of the level of carbon dioxide in the cargo storage.

It will be appreciated that the rate of change of oxygen level or carbon dioxide level in the cargo storage space is the rate of change (i.e. derivative) of the oxygen level or carbon dioxide level with respect to time (i.e. it is the gradient of a plot of level of oxygen or carbon dioxide in the cargo storage space with respect to time). The respiration parameter indicative of the rate of change of oxygen and/or carbon dioxide level in the cargo storage space may be the rate of change of oxygen level or carbon dioxide level in the cargo storage space. Alternatively, the respiration parameter indicative of the rate of change of oxygen and/or carbon dioxide level in the cargo storage space may be related to (e.g. dependent on) the rate of change of oxygen level or carbon dioxide level in the cargo storage space. For example, the respiration parameter indicative of the rate of change of oxygen and/or carbon dioxide level in the cargo storage space may be proportional to the rate of change of oxygen level or carbon dioxide level in the cargo storage space. Alternatively, the respiration parameter indicative of the rate of change of oxygen and/or carbon dioxide level in the cargo storage space may be some other function, e.g. an exponential, logarithmic or trigonometric function, the rate of change of oxygen level or carbon dioxide level in the cargo storage space.

It may be that the respiration parameter value is determined from a plurality of predetermined respiration parameter values. For example, there may be at least three of said predetermined respiration parameter values. Each respiration parameter value may correspond to a respective range of rate of change of oxygen level and/or a respective range of rate of change of carbon dioxide level. It may be that the control module determining the respiration parameter value comprises: the control module determining a rate of change of oxygen level and/or a rate of change of carbon dioxide level in the cargo storage space due to respiration of the goods in the cargo storage space; and the control module determining the respective respiration parameter value, from the plurality of predetermined respiration parameter values, associated with the rate of change of oxygen level and/or the rate of change of carbon dioxide level.

It may be that determining the rate of change of carbon dioxide and/or oxygen level in the cargo storage space comprises (i.e. directly) measuring said rate of change of carbon dioxide and/or oxygen level. Alternatively, it may be that determining the rate of change of carbon dioxide level and/or oxygen level comprises inferring the rate of change of carbon dioxide level and/or oxygen level from one or more other measurements. For example, the method may comprise measuring the carbon dioxide level and/or the oxygen level in the cargo storage space and inferring the rate of change of carbon dioxide level and/or oxygen level based on the measured carbon dioxide and/or oxygen levels, for example, based on the time at which the measurement is taken (e.g. relative to a time at which goods were introduced into the cargo storage space or relative to a time at which an earlier measurement of carbon dioxide and/or oxygen level was taken).

The oxygen level setpoint may be an oxygen level setpoint range. The carbon dioxide level setpoint may be a carbon dioxide level setpoint range.

Targeting the oxygen level setpoint may comprise targeting an oxygen level which falls within the oxygen level setpoint range. Targeting the carbon dioxide level setpoint may comprise targeting a carbon dioxide level which falls within the carbon dioxide level setpoint range.

It may be that the gas exchange module is operable in a plurality of different operational modes. It may be that the control module controlling operation of the gas exchange module comprises: the control module selecting one of the operational modes based on the determined respiration parameter value; and the control module operating the gas exchange module in the selected operational mode to cause variation in the level of a respective component gas in the cargo storage space.

It may be that the CA system comprises a plurality of different gas exchange modules. It may be that the method comprises: the control module selecting one of the gas exchange modules to operate based on the determined respiration parameter value; and the control module operating the selected gas exchange module to cause variation in the level of a respective component gas in the cargo storage space.

It may be that the CA system comprises a plurality of different gas exchange modules, wherein at least one of the said gas exchange modules is operable in a plurality of different operational modes. It may be that the control module controlling operation of the gas exchange module comprises: the control module selecting one of the gas exchange modules to operate, and optionally selecting one of the operational modes, based on the determined respiration parameter value; and the control module operating the selected gas exchange module in the selected operational mode to cause variation in the level of a respective component gas in the cargo storage space.

It may be that the method comprises the control module: determining the parameter indicative of the level of carbon dioxide and/or the parameter indicative of the level of oxygen in the cargo storage space; and controlling operation of the gas exchange module based on the parameter indicative of the level of carbon dioxide and/or the parameter indicative of the level of oxygen in addition to the determined respiration parameter value.

It may be that the gas exchange module is operable in a plurality of different operational modes and that the method comprises: the control module determining the parameter indicative of the level of carbon dioxide and/or the parameter indicative of the level of oxygen in the cargo storage space; the control module selecting one of the operational modes based on the parameter indicative of the level of carbon dioxide and/or the parameter indicative of the level of oxygen in the cargo storage space in addition to the determined respiration parameter value; and the control module operating the gas exchange module in the selected operational mode to cause variation in the level of a respective component gas in the cargo storage space.

It may be that the CA system comprises a plurality of different gas exchange modules and that the method comprises: the control module determining the parameter indicative of the level of carbon dioxide and/or the parameter indicative of the level of oxygen in the cargo storage space; the control module selecting one of the gas exchange modules to operate based on the parameter indicative of the level of carbon dioxide and/or the parameter indicative of the level of oxygen in the cargo storage space in addition to the determined respiration parameter value; and the control module operating the selected gas exchange module to cause variation in the level of a respective component gas in the cargo storage space.

It may be that the CA system comprises a plurality of different gas exchange modules, wherein at least one of the said gas exchange modules is operable in a plurality of different operational modes, and the method comprises: the control module determining the parameter indicative of the level of carbon dioxide and/or the parameter indicative of the level of oxygen in the cargo storage space; the control module selecting one of the gas exchange modules to operate, and optionally selecting one of the operational modes, based on the parameter indicative of the level of carbon dioxide and/or the parameter indicative of the level of oxygen in the cargo storage space in addition to the determined respiration parameter value; and the control module operating the selected gas exchange module in the selected operational mode to cause variation in the level of a respective component gas in the cargo storage space.

It may be that the control module is configured to operate the gas exchange module according to a plurality of different predetermined atmospheric control logics. It may be that the method comprises: the control module selecting an operational atmospheric control logic from the plurality of different predetermined atmospheric control logics for atmospheric control of goods in the cargo storage space; and the control module controlling operation of the gas exchange module dependent on the selected operational atmospheric control logic and the determined respiration parameter value.

It may be that the method comprises: the control module receiving an input indicative of the nature of the goods stored in, or to be stored in, the cargo storage space; and the operational atmospheric control logic being selected based on the input.

It may be that the plurality of predetermined atmospheric control logics comprises: an oxygen priority logic; and a carbon dioxide priority logic. It may be that each of the oxygen priority logic and the carbon dioxide priority logic defines operational gas exchange modules and/or operational modes for a plurality of sub-ranges of the respective operational range of atmospheric conditions, each sub-range being defined by limit levels of oxygen and/or carbon dioxide. It may be that the operational gas exchange modules and/or operational modes defined for a priority sub-range of the oxygen priority logic are configured to regulate the oxygen level in the cargo storage space towards an oxygen level setpoint in preference to regulation of the carbon dioxide level in the cargo storage space towards a carbon dioxide level setpoint, when compared with a corresponding sub-range of the carbon dioxide priority logic. It may be that the operational gas exchange modules and/or operational modes defined for a priority sub-range of the carbon dioxide priority logic are configured to regulate the carbon dioxide level in the cargo storage space towards a carbon dioxide level setpoint in preference to regulation of the oxygen level in the cargo storage space towards an oxygen level setpoint, when compared with a corresponding sub-range of the oxygen priority logic. It may be that the priority sub-range corresponds to an excessive level or an insufficient level of the respective gas component at an extreme of the operational range.

It may be that the plurality of atmospheric control logics comprises a balanced priority logic which defines operational gas exchange modules and/or operational modes for a plurality of sub-ranges of the respective operational range of atmospheric conditions, each sub-range being defined by limit levels of oxygen and/or carbon dioxide. It may be that the operational gas exchange modules and/or operational modes defined for a priority sub-range of the balanced priority logic are configured to regulate both the oxygen level and the carbon dioxide level in the cargo storage space towards respective oxygen and carbon dioxide level setpoints at respective rates of gas component variation which are intermediate when compared to rates of gas component variation of the respective gas components in the corresponding priority sub-ranges of the oxygen priority logic and the carbon dioxide priority logic.

It may be that the CA system is a passive CA system. It will be understood that a passive CA system lacks (i.e. does not comprise) a gas exchange module operable to reduce the level of oxygen in the cargo storage space. It may be that the passive CA system comprises a carbon dioxide removal module operable to remove carbon dioxide from the atmosphere in the cargo storage space. The carbon dioxide removal module may comprise a carbon dioxide scrubber or a carbon dioxide gas separation membrane. It may be that the CA system further comprises an ambient air supply module operable to supply ambient air to the cargo storage space. The ambient air supply module may comprise an air vent for supplying ambient air from outside the cargo storage space to the cargo storage space.

It may be that the CA system is an active CA system. It will be understood that an active CA system is a CA system which is operable to reduce the level of oxygen in the cargo storage space.

It may be that the active CA system comprises a nitrogen supply module operable to supply nitrogen to the atmosphere in the cargo storage space. The nitrogen supply module may supply pure nitrogen to the atmosphere in the cargo storage space. Alternatively, the nitrogen supply module may supply a nitrogen-rich (e.g. nitrogen-enriched) gas to the atmosphere in the cargo storage space. The nitrogen-rich (e.g. nitrogen-enriched) gas may contain no less than about 80%, for example, no less than about 90%, or no less than about 95%, or no less than about 99%, of nitrogen gas by volume. The nitrogen supply module may comprise a nitrogen gas separation membrane.

The nitrogen supply module may be operable in a plurality of different operational modes. It may be that the composition of the gas supplied to the cargo storage space by the nitrogen supply module is different in the different operational modes. For example, it may be that the concentration of nitrogen in the gas supplied by the nitrogen supply module to the cargo storage space is different in the different operational modes. The method may comprise: the control module selecting one of the operational modes of the nitrogen supply module based on the determined respiration parameter value; and the control module operating the nitrogen supply module in the selected operational mode to cause variation in the level of nitrogen in the cargo storage space. Supply of nitrogen to the cargo storage space may cause a reduction in the level of oxygen and/or carbon dioxide in the cargo storage space.

It may be that the nitrogen supply module is operable to supply nitrogen to the atmosphere in the cargo storage space when operating in a nitrogen supply mode, for example when operating in one of a plurality of different nitrogen supply modes. It may be that the nitrogen supply module is also operable in one or more operational modes other than a nitrogen supply mode. For example, it may be that the nitrogen supply module is operable to supply ambient air to the atmosphere in the cargo storage space when operating in an ambient air supply mode.

It may be that the active CA system further comprises an ambient air supply module operable to supply ambient air to the cargo storage space. The ambient air supply module may comprise an air vent for supplying ambient air from outside the cargo storage space to the cargo storage space.

The cargo storage space may be a cargo storage space of a freight container.

According to a second aspect, there is provided a controlled atmosphere (CA) system for regulating the atmosphere in a cargo storage space, the CA system comprising one or more gas exchange modules, an oxygen sensor operable to measure a parameter indicative of a level of oxygen in the cargo storage space and/or a carbon dioxide sensor operable to measure a parameter indicative of a level of carbon dioxide in the cargo storage space, and a control module configured to carry out the method according to the first aspect. The oxygen sensor may be an oxygen concentration sensor or an oxygen partial pressure sensor. The carbon dioxide sensor may be a carbon dioxide concentration sensor or a carbon dioxide partial pressure sensor. The one or more gas exchange modules may comprise a carbon dioxide removal module and/or an ambient air supply module.

The cargo storage space may be a cargo storage space of a freight container. The controlled atmosphere system may be installed in the freight container.

According to a third aspect, there is provided a freight container comprising the controlled atmosphere (CA) system according to the second aspect.

According to a fourth aspect, there is provided a computer program comprising instructions to cause a controlled atmosphere (CA) system to carry out the method according to the first aspect.

According to a fifth aspect, there is a provided a non-transitory computer-readable medium storing, or a data carrier signal carrying, the computer program according to the fourth aspect.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Embodiments will now be described by way of example only, with reference to the Figures, in which:

FIG. 7 is a table illustrating which gas exchange modules and/or operational modes are appropriate for particular carbon dioxide and oxygen levels when a controlled atmosphere system operates according to a carbon dioxide priority logic;

FIG. 8 is a table illustrating which gas exchange modules and/or operational modes are appropriate for particular carbon dioxide and oxygen levels when a controlled atmosphere system operates according to an oxygen priority logic;

DETAILED DESCRIPTION

Figure 1:
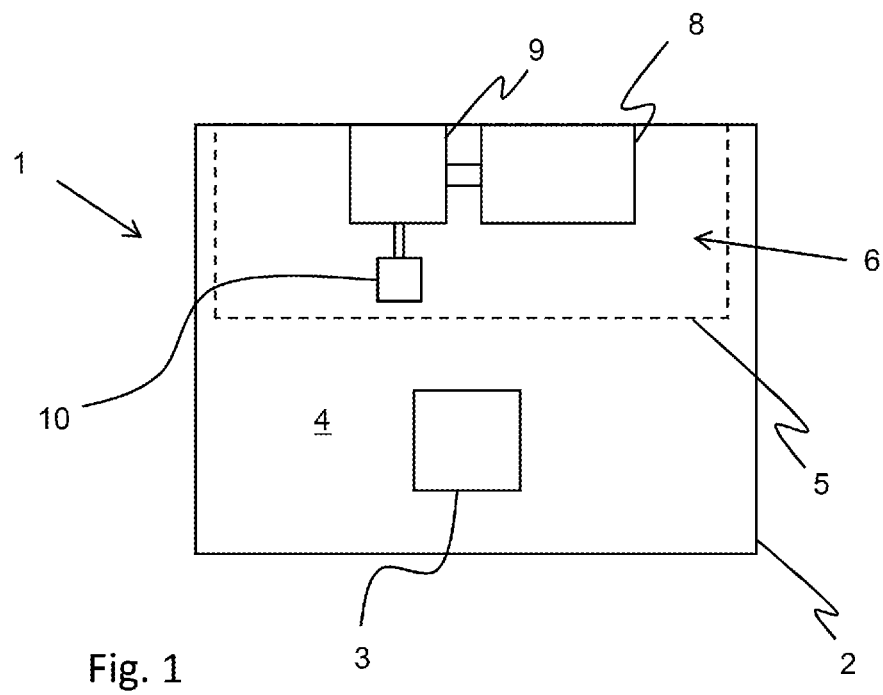
FIG. 1 is a plan view of a cargo storage space including stored goods and an active controlled atmosphere system.

FIG. 1 schematically shows a transport container 1 comprising external walls 2 which separate an internal atmosphere of interior gas from an external atmosphere of exterior gas. By way of example, perishable goods 3 (such as a load of fresh fruit and/or vegetables) are provided in a cargo storage space 4 of the container.

A refrigeration module 5 is installed at one end of the container adjacent a wall 2 of the container. The refrigeration module 5 is in fluid communication with the interior of the cargo storage space 4 (as indicated by dashed line 5 demarcating the boundary of the refrigeration module 5) so as to permit exchange of gas between the cargo storage space 4 and the refrigeration module 5. The refrigeration module 5 includes a refrigeration circuit including an evaporator, a condenser and a compressor connected to one another via flow lines and an expansion valve so that, in use, the evaporator is configured to transfer heat from interior gas to circulating refrigerant and the condenser is configured to transfer heat from the refrigerant to exterior gas. For simplicity, the refrigeration components of the refrigeration module 5 are not shown in FIG. 1.

The refrigeration module 5 also includes an active controlled atmosphere system 6. The controlled atmosphere system 6 includes a gas exchange module 8 operable to control a flow of gas from the controlled atmosphere system 6 into the cargo storage space. The gas exchange module 8 includes a compressor, a vent to the exterior of the container, a vent to the interior of the container, and a nitrogen (i.e. $N_2$) gas separation membrane. The gas exchange module 8 is operable to supply ambient air (i.e. exterior gas from outside the container) or nitrogen-enriched gas to the interior of the container.

In order to supply nitrogen-enriched gas to the interior of the container, the compressor is operated to pump exterior gas, derived from the vent to the exterior, and/or interior gas, derived from the vent to the interior, through the nitrogen gas separation membrane. The nitrogen gas separation membrane selectively permits transfer of nitrogen, in preference to oxygen (i.e. $O_2$) or carbon dioxide (i.e. $CO_2$), therethrough, such that nitrogen-enriched gas can be generated from an input of interior and/or exterior air and subsequently pumped into the cargo storage space. The gas exchange module 8 is operable in three different nitrogen supply modes in which the concentration of nitrogen in the gas output by the gas exchange module is different for the same input conditions. In particular, the gas exchange module 8 is operable in a first $N_2$ mode, a second $N_2$ mode and third $N_2$ mode, wherein the concentration of nitrogen in the gas output by the gas exchange module is lower in the second $N_2$ mode than in the first $N_2$ mode, and lower in the third $N_2$ mode than in the second $N_2$ mode. The concentrations of oxygen and carbon dioxide also differ in the three different nitrogen supply modes of the gas exchange module.

It will be appreciated that, although in this particular implementation of the invention the gas exchange module 8 makes use of a nitrogen gas separation membrane to produce a nitrogen-enriched gas, any other suitable method of supplying nitrogen to the cargo storage space, as known in the field, may be used. For example, the gas exchange module may include a supply of stored nitrogen gas (e.g. canisters of compressed nitrogen gas).

In order for the gas exchange module to supply ambient air to the interior of the container, the compressor is operated to pump exterior gas, derived from the vent to the exterior, directly into the container, bypassing the nitrogen gas separation membrane. In alternative embodiments, ambient air may also be supplied to the interior of the container by the compressor pumping exterior gas through the membrane under such conditions (including air flow rate and air pressure) that the composition of the air (such as the relative levels of $N_2$, $O_2$ and $CO_2$) is not significantly altered.

Accordingly, the gas exchange module 8 functions as both a nitrogen gas exchange module and an ambient air supply module.

The controlled atmosphere system 6 also includes a control module 9 operatively connected to the gas exchange module 8. The control module 9 is configured to control operation of the gas exchange module 8, as explained in more detail below.

The controlled atmosphere system 6 further includes a sensor module 10. The sensor module 10 includes an oxygen sensor and a carbon dioxide sensor operable to measure the levels of oxygen and carbon dioxide, respectively, in the cargo storage space. In this particular embodiment, the oxygen sensor is an oxygen concentration sensor and the carbon dioxide sensor is a carbon dioxide concentration sensor, these sensors being operable to measure the concentration of oxygen and carbon dioxide, respectively, in the cargo storage space. The oxygen and carbon dioxide concentration sensors may be gas concentration sensors of any type known in the field, such as electrochemical gas sensors or optical gas sensors (for example, infra-red gas sensors). However, in alternative embodiments, the oxygen and carbon dioxide sensors may be oxygen and carbon dioxide partial pressure sensors operable to measure the partial pressure of oxygen and carbon dioxide, respectively, in the cargo storage space. In any embodiments, the control module 9 is operatively connected to the sensor module 10 for receiving measurements of the levels of oxygen and carbon dioxide in the cargo storage space. The sensor module 10 may also include other types of sensor, such as an ozone sensor or an ethylene sensor, and the control module 9 may receive measurements of, for example, the levels of ozone or ethylene in the cargo storage space.

The composition of the interior gas in the cargo storage space typically varies during transport of the goods due to natural respiration of the goods. Before loading of the goods into the container, the composition of the interior gas is typically the same as the composition of the exterior gas. In particular, the initial composition of the interior gas is typically the same as ambient air. Accordingly, the interior gas initially contains, by volume, about 78% nitrogen ($N_2$), about 21% oxygen ($O_2$), about 0.9% argon (Ar) and about 0.04% carbon dioxide ($CO_2$), the balance being made up of small quantities of other gases such as neon (Ne), helium (He) and methane ($CH_4$). Depending on the local levels of humidity, the interior gas may also include up to around 5% by volume of water vapour ($H_2O$).

Figure 2:
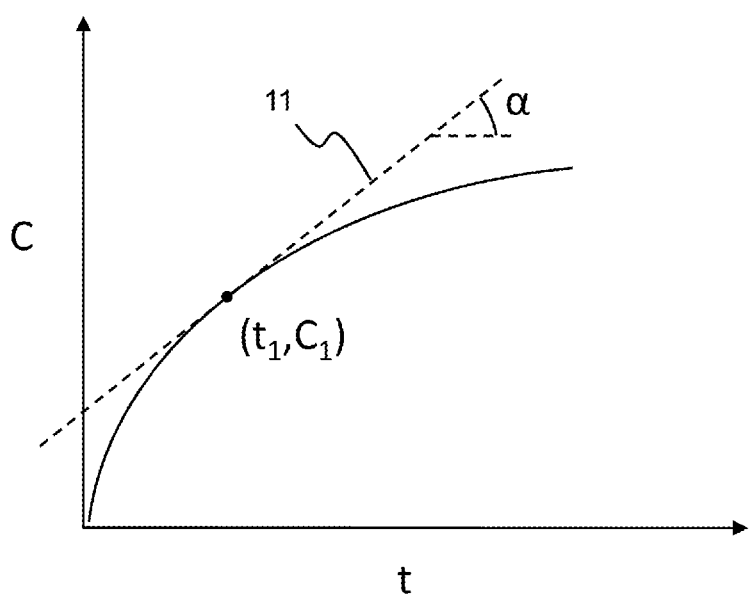
FIG. 2 is a plot of the carbon dioxide concentration in the atmosphere of a closed cargo storage space as a function of time due to respiration of goods in the cargo storage space.

During transport, the perishable goods consume oxygen and produce carbon dioxide as part of their natural ripening process. FIG. 2 shows schematically how, in the absence of atmospheric control, the concentration, C, of carbon dioxide in a closed cargo storage space (i.e. a cargo storage space sealed from the exterior such that gas exchange between the interior of the cargo storage space and the exterior is negligible) increases as a function of time, t, due to aerobic respiration of the goods. Initially, the concentration of carbon dioxide in the cargo storage space is low (i.e. similar to ambient) but the rate of carbon dioxide production is high. The concentration of carbon dioxide therefore tends to increase as time passes. At long times, however, the concentration of carbon dioxide in the closed cargo storage space tends to saturate, for example because the amount of oxygen in the cargo storage space, and available for aerobic respiration, decreases.

Accordingly, as can be seen in FIG. 2, the rate of change of concentration of carbon dioxide with respect to time itself varies as a function of time. In general, the rate of change of concentration of carbon dioxide with respect to time, $$\frac{dC}{dt},$$

at a particular point in time, $t_1$, can be evaluated by finding the gradient of the tangent line (indicated in FIG. 2 by dashed line 11) to the concentration curve at point $(t_1, C_1)$. The rate of change of concentration can therefore be determined as $$\frac{dC}{dt} = \tan \alpha,$$

where $\alpha$ is the angle between the tangent line and the horizontal (i.e. t) axis.

The rate of change of carbon dioxide concentration with respect to time is a measure of the rate of respiration of the goods. Accordingly, it is possible to define a respiration parameter, RP, as:

$$RP = \frac{dC}{dt} = \tan \alpha$$

RP reflects the instantaneous rate at which the goods in the cargo storage space are respiring. Accordingly, a high value of RP indicates quickly respiring goods such that carbon dioxide levels in the cargo storage space will tend to increase relatively quickly and, correspondingly, oxygen levels will tend to decrease relatively quickly. In contrast, a low value of RP indicates slowly respiring goods such that carbon dioxide levels in the cargo storage space will tend to increase relatively slowly and, correspondingly, oxygen levels will tend to decrease relatively slowly. Given the relationship between carbon dioxide, oxygen and nitrogen levels in the cargo storage space, a respiration parameter can also be defined in terms of the rate of change of oxygen level. The respiration parameter defined in terms of the rate of change of oxygen level may be derived from the respiration parameter defined in terms of the rate of change of carbon dioxide level. Alternatively, the respiration parameter defined in terms of rate of change of oxygen level may be determined independently, for example by monitoring the level of oxygen in the cargo storage space and determining its rate of change with respect to time.

Different types of goods respire at different rates. Different types of goods also ripen (i.e. reach an optimum state for human or animal consumption) at different rates. Moreover, respiration and ripening are both dynamic processes whose rates depend on many different parameters, including harvest conditions and transportation conditions such as air temperature and air composition. The ripening process, and therefore the potential shelf-life, of different types of goods is affected by surrounding carbon dioxide and oxygen levels in different ways. The response of goods to changing carbon dioxide and oxygen levels may also depend on the temperature and/or relative humidity levels. Accordingly, different types of goods have different requirements in terms of optimal atmospheric conditions in order to maximize shelf-life and/or to control the natural ripening process such that the timing of ripening can be controlled (for example, so that goods may ripen naturally just in time for delivery for sale or use).

Figure 3:
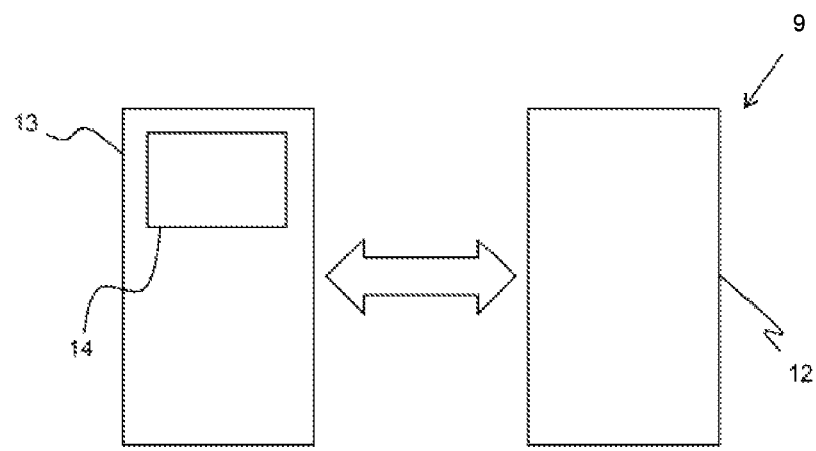
FIG. 3 shows schematically a processor in communication with a computer readable medium storing computer executable program instructions for controlling operation of a controlled atmosphere system.

The control module 9 is therefore configured to control operation of the gas exchange module 8 in different ways dependent on the nature of the goods stored in the cargo storage space. In particular, as shown in FIG. 3, the control module 9 includes a processor 12 in communication with a computer readable medium 13 containing computer executable program instructions 14 for controlling operation of the gas supply module differently dependent on the nature of the goods stored in the cargo storage space. The controlled atmosphere system control module 9 may be integrated into a refrigeration module control module (not shown). Alternatively, the controlled atmosphere system control module 9 may be separate from the refrigeration module control module, although the controlled atmosphere system control module 9 typically communicates with the refrigeration module control module. For example, it may be that the refrigeration module control module is a master control module and the controlled atmosphere system control module 9 is a slave control module under the control of the refrigeration module control module, or vice versa.

Figure 4:
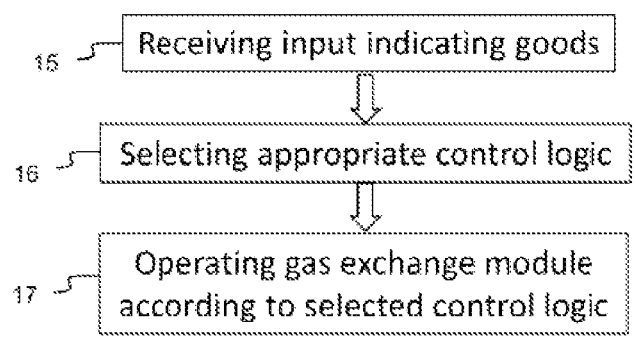
FIG. 4 is a flow chart illustrating a method of operating a controlled atmosphere system.

As outlined in FIG. 4, the control module is configured to: receive an input indicative of the goods loaded into the cargo storage space (block 15); to select an appropriate control logic for those goods based on the input (block 16); and then to operate the gas exchange module according to the selected control logic (block 17). The input indicative of the goods may be an input provided by a user. For example, a user may select a goods type from a list of possible goods types using an interface, each goods type being associated with different atmospheric control requirements and therefore different control logics, for example in a lookup table or database of the control module.

In the active controlled atmosphere system shown in FIG. 1, the available control logics are a carbon dioxide priority logic, an oxygen priority logic, and a balanced priority logic. The carbon dioxide priority logic is configured to control operation of the gas exchange module in such a way as to prioritise bringing the carbon dioxide level in the cargo storage space to within a carbon dioxide level setpoint range over bringing the oxygen level in the cargo storage space to within an oxygen level setpoint range. In contrast, the oxygen priority logic is configured to control operation of the gas exchange module in such a way as to prioritise bringing the oxygen level in the cargo storage space to within an oxygen level setpoint range over bringing the carbon dioxide level in the cargo storage space to within a carbon dioxide level setpoint range.

In particular, each of the oxygen priority logic and the carbon dioxide priority logic define which operational mode the gas exchange module is operated in for a plurality of sub-ranges of respective operational ranges of carbon dioxide and oxygen concentrations. The operational modes defined for a priority sub-range of the oxygen priority logic are selected to regulate the oxygen level in the cargo storage space towards an oxygen level setpoint range in preference to regulation of the carbon dioxide level in the cargo storage space towards a carbon dioxide level setpoint range, when compared with a corresponding sub-range of the carbon dioxide priority logic (i.e. a sub-range over which control procedures are specified for the same set of carbon dioxide and oxygen levels). Similarly, the operational defined for a priority sub-range of the carbon dioxide priority logic are selected to regulate the carbon dioxide level in the cargo storage space towards a carbon dioxide level setpoint range in preference to regulation of the oxygen level in the cargo storage space towards an oxygen level setpoint range, when compared with a corresponding sub-range of the oxygen priority logic.

The balanced priority logic is configured to control operation of the gas exchange module to bring both the carbon dioxide and oxygen levels to within carbon dioxide and oxygen level setpoint ranges without prioritising one particular gas over the other. In particular, the balanced priority logic defines which modes are to be operated for a plurality of sub-ranges of a respective operational range of carbon dioxide and oxygen levels, wherein the operational modes defined for a priority sub-range of the balanced priority logic are selected to regulate both the oxygen level and the carbon dioxide level in the cargo storage space towards respective oxygen and carbon dioxide level setpoint ranges at respective rates of gas component variation which are intermediate when compared to rates of gas component variation of the respective gas components in the corresponding priority sub-ranges of the oxygen priority logic and the carbon dioxide priority logic.

It will be appreciated that similar logics may be defined for controlled atmosphere systems comprising more than one gas exchange module (for example, where the supply of ambient air and the supply of nitrogen-enriched gas are achieved by two different modules such as an air supply module and a nitrogen supply module). In such systems, each of the oxygen priority logic and the carbon dioxide priority logic may define which gas exchange modules operate (and, for the gas exchange module, which operational mode the module is operated in) for a plurality of sub-ranges of respective operational ranges of carbon dioxide and oxygen concentrations. The operational gas exchange modules and/or modes defined for a priority sub-range of the oxygen priority logic may be selected to regulate the oxygen level in the cargo storage space towards an oxygen level setpoint range in preference to regulation of the carbon dioxide level in the cargo storage space towards a carbon dioxide level setpoint range, when compared with a corresponding sub-range of the carbon dioxide priority logic (i.e. a sub-range over which control procedures are specified for the same set of carbon dioxide and oxygen levels). Similarly, the operational gas exchange modules and/or modes defined for a priority sub-range of the carbon dioxide priority logic may be selected to regulate the carbon dioxide level in the cargo storage space towards a carbon dioxide level setpoint range in preference to regulation of the oxygen level in the cargo storage space towards an oxygen level setpoint range, when compared with a corresponding sub-range of the oxygen priority logic. The balanced priority logic may be configured to control operation of the gas exchange modules to bring both the carbon dioxide and oxygen levels to within carbon dioxide and oxygen level setpoint ranges without prioritising one particular gas over the other. In particular, the balanced priority logic may define which gas exchange modules and/or modes are to be operated for a plurality of sub-ranges of a respective operational range of carbon dioxide and oxygen levels, wherein the operational gas exchange modules and/or operational modes defined for a priority sub-range of the balanced priority logic are selected to regulate both the oxygen level and the carbon dioxide level in the cargo storage space towards respective oxygen and carbon dioxide level setpoint ranges at respective rates of gas component variation which are intermediate when compared to rates of gas component variation of the respective gas components in the corresponding priority sub-ranges of the oxygen priority logic and the carbon dioxide priority logic.

In any case, the provision of a plurality, such as at least two or at least three, different priority logics is beneficial because perishable goods may be divided into different categories which have different optimal cargo transport conditions.

In particular, goods in different categories have different relative sensitivities to oxygen and carbon dioxide levels. For example, in some cases, the ripening process of different types of goods can be more or less sensitive to relative levels of oxygen and carbon dioxide. Accordingly, dependent on the type of goods being stored, it can be beneficial to prioritise control of oxygen levels or carbon dioxide levels.

Alternatively, for some types of goods, it is preferable to control oxygen and carbon dioxide levels with equal weighting.

Figure 5:
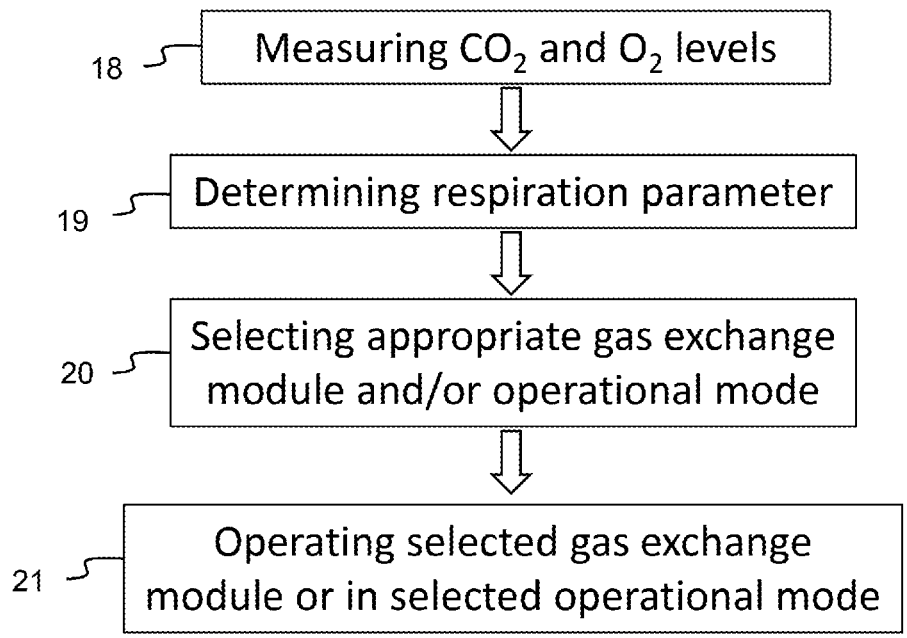
FIG. 5 is a flow chart illustrating a method of selecting an appropriate gas exchange module and/or operational mode based on measured carbon dioxide and oxygen levels.

In each of the carbon dioxide priority logic, the oxygen priority logic and the balanced priority logic, the basic method of operation involves the steps (as shown in FIG. 5) of: the sensor module 10 determining the levels of carbon dioxide and oxygen in the cargo storage space and outputting this to the control module 9 (block 18); the control module 9 determining the respiration parameter, RP, indicative of the current rate of respiration of the goods (block 19); the control module 9 selecting the appropriate gas exchange module to operate, where a plurality of gas exchange modules are present, and/or the operational mode of the gas exchange module, where appropriate, based on the measured carbon dioxide and oxygen levels and RP (block 20); and then operating the selected gas exchange module in the selected mode (block 21). In other examples, different gas exchange modules or modes may be selectable.

Figure 6:
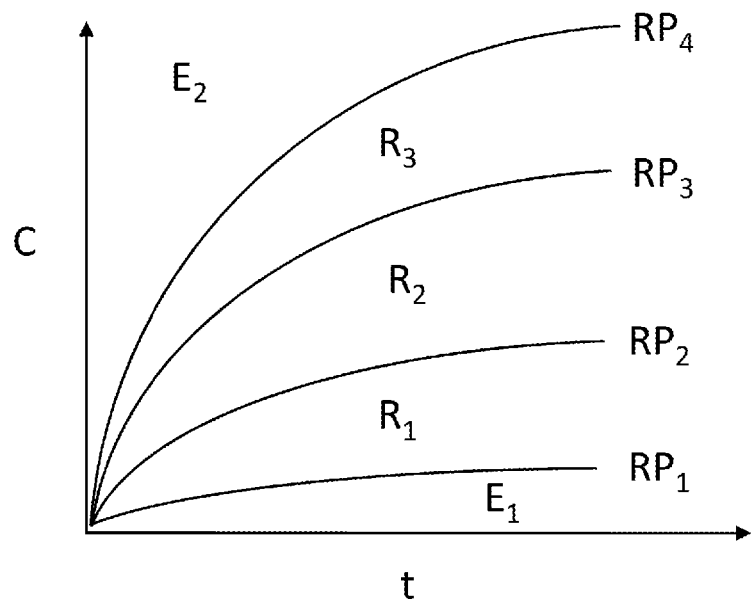
FIG. 6 is a plot showing the variation of carbon dioxide concentration in the atmosphere of a closed cargo storage space when storing goods which respire at four different rates ($RP_1$, $RP_2$, $RP_3$ and $RP_4$)

Use of the respiration parameter, RP, in selection of the operational gas exchange module or mode is explained in more detail with reference to FIG. 6. Although RP may be determined by measuring the carbon dioxide and/or oxygen levels in the cargo storage space at two or more different points in time and numerically evaluating the rate of change of the carbon dioxide and/or oxygen levels, it is more convenient to obtain the respiration parameter by comparing the measured carbon dioxide and/or oxygen levels at a particular point in time to calibration data, for example, stored in a look-up table. In fact, rather than determining the precise rate of change of carbon dioxide or oxygen level, the control module may determine an averaged respiration parameter value associated with a range of rates of change. For example, FIG. 6 shows the variation of carbon dioxide concentration in the atmosphere of a closed cargo storage space when storing example goods which respire at four different rates (labelled as $RP_1$, $RP_2$, $RP_3$ and $RP_4$). Three different regions ($R_1$, $R_2$ and $R_3$) of the concentration-time plot may be defined between these four example curves. These three regions may be used to define averaged respiration parameter values for use in the control logics. When the measured concentration of carbon dioxide at a particular point in time falls between curves $RP_1$ and $RP_2$, the averaged respiration parameter is set to $R_1$ corresponding to a low respiration rate. When the measured concentration of carbon dioxide at a particular point in time falls between curves $RP_2$ and $RP_3$, the averaged respiration parameter is set to $R_2$ corresponding to a mid-level respiration rate. And when the measured concentration of carbon dioxide at a particular point in time falls between curves $RP_3$ and $RP_4$, the averaged respiration parameter is set to $R_3$ corresponding to a high respiration rate.

In addition, FIG. 6 indicates two "error regions" $E_1$ and $E_2$ of the concentration-time plot in which the rate of carbon dioxide consumption is either very low or very high. The measured concentration of carbon dioxide falling in region $E_1$ or $E_2$ is indicative of an error in the system, such as a major leak or missing goods.

The table shown in FIG. 7 provides an example of a carbon dioxide priority logic which makes use of the measured carbon dioxide and oxygen levels as well as the averaged respiration parameter value. In particular, the table shows which particular operational modes of the gas exchange module are operated dependent on the measured carbon dioxide level, the measured oxygen level and the averaged respiration parameter value.

The carbon dioxide priority logic defines two critical situations, (i) when the carbon dioxide level in the cargo storage space is found to be above a maximum allowed level and (ii) when the oxygen level in the cargo storage space is found to be below a minimum allowed level. If the carbon dioxide level is above the maximum allowed level, the control modules causes the gas exchange module to operate to provide the cargo storage space with a supply of ambient air from outside the container. Since the concentration of carbon dioxide in ambient air is relatively low, supply of ambient air quickly reduces the level of carbon dioxide in the cargo storage space as it displaces interior air. Supply of ambient air tends to increase the level of oxygen in the cargo storage space. However, when the level of carbon dioxide is above the maximum allowed level, ventilation is used to bring the carbon dioxide level down quickly regardless of the level of oxygen in the cargo storage space. Alternatively, if the level of oxygen is below the minimum allowed level, the control module also causes the gas exchange module to operate to provide the cargo storage space with a supply of ambient air from outside the container. Since the concentration of oxygen in ambient air is relatively high, supply of ambient air quickly increases the level of oxygen in the cargo storage space. Supply of ambient air tends to decrease the level of carbon dioxide in the cargo storage space. However, when the level of oxygen is below the minimum allowed level, ventilation is used to bring the oxygen level up quickly regardless of the level of carbon dioxide in the cargo storage space.

Other than when the oxygen level in the cargo storage space is less than the minimum allowed level, the carbon dioxide priority logic is designed to select the gas exchange module or mode for operation which most effectively controls the carbon dioxide level, with the oxygen level only being a secondary consideration. In the particular example, the carbon dioxide priority logic defines sixteen different situations (i.e. sub-ranges of the operational range of atmospheric conditions for the logic) in which different modes could be used to control the carbon dioxide and oxygen levels. The sixteen situations are defined by: the carbon dioxide level in the cargo storage space being below, in or above a carbon dioxide setpoint range; the oxygen level in the cargo storage space being below, in or above an oxygen setpoint range; and the average respiration parameter being determined as $R_1$, $R_2$ or $R_3$.

In the example carbon dioxide priority logic shown in FIG. 7, if the carbon dioxide level is found to be below the carbon dioxide level setpoint range, and the oxygen level is found to be below, in or above the oxygen level setpoint range, gas exchange module 8 is not operated. Instead, gas is simply permitted to circulate (for example, under the influence of the refrigeration module) within the cargo storage space. Since the carbon dioxide level is low and the concentration of carbon dioxide in ambient air is relatively low, supply of ambient air would not serve to increase the level of carbon dioxide in the cargo storage space. Similarly, since the carbon dioxide level is low, supply of nitrogen-enriched (and consequently carbon-dioxide depleted) gas to the cargo storage space would not serve to increase the level of carbon dioxide in the cargo storage space. However, by allowing gas to circulate within the cargo storage space, the level of carbon dioxide will increase naturally over time due to respiration of the goods.

If the carbon dioxide level is found to be in the carbon dioxide setpoint range while the oxygen level is in the oxygen level setpoint range, the gas exchange module 8 is not operated and instead gas is simply permitted to circulate within the cargo storage space. When both the carbon dioxide and oxygen levels are in their respective setpoint ranges, there is no need to increase or decrease the carbon dioxide or oxygen levels.

If the carbon dioxide level is found to be in the carbon dioxide level setpoint range and the oxygen level is found to be below the oxygen level setpoint range, the gas exchange is operated to supply ambient air to the cargo storage space. Since the concentration of oxygen in ambient air is relatively high, supply of ambient air to the cargo storage space will tend to increase the level of oxygen in the cargo storage space relatively quickly, while decreasing the level of carbon dioxide. Decreasing levels of carbon dioxide are permitted as long as the carbon dioxide level remains within the carbon dioxide level setpoint range.

If the carbon dioxide level is found to be in the carbon dioxide level setpoint range and the oxygen level is found to be above the oxygen level setpoint range, the gas exchange module is operated to supply nitrogen-enriched gas to the cargo storage space. Supplying nitrogen-enriched gas to the cargo storage space tends to cause oxygen and carbon dioxide in the cargo storage space to be displaced, for example through leak paths between the walls 2 enclosing the cargo storage space, to the exterior of the container. Accordingly, supplying nitrogen-enriched gas to the cargo storage space tends to cause both the level of oxygen and the level of carbon dioxide in the cargo storage space to decrease. However, the displacement effect of suppling nitrogen-enriched gas to the cargo storage space tends to more strongly affect the level of oxygen in the cargo storage space than the level of carbon dioxide, particularly when the level of oxygen in the cargo storage space prior to supply of nitrogen-enriched gas is significantly higher than the level of carbon dioxide. This is because the displacement effect tends to be roughly proportional to the concentration of the respective gases in the cargo storage space prior to addition of the nitrogen-enriched gas; the concentration of oxygen in the cargo storage space is most often higher than the concentration of carbon dioxide, particularly in the initial stages of goods transport.

The particular nitrogen supply mode in which the gas exchange module is operated depends on the averaged respiration parameter value. If the averaged respiration parameter is set to $R_1$, indicative of more slowly respiring goods, the gas exchange module is operated in the first $N_2$ mode. If the averaged respiration parameter is set to $R_2$, indicative of goods which are respiring at an intermediate rate, the gas exchange module is operated in the second $N_2$ mode. If the averaged respiration parameter is set to $R_3$, indicative of more quickly respiring goods, the gas exchange module is operated in the third $N_2$ mode. As explained above, the concentration of nitrogen, oxygen and carbon dioxide in the nitrogen-enriched gas supplied to the cargo storage space differs in the first, second and third $N_2$ modes such that it is possible to more effectively compensate for the different respiration rates of the goods.

If the carbon dioxide level is found to be above the carbon dioxide setpoint range while the oxygen level is in or below the oxygen level setpoint range, the gas exchange module is operated to supply ambient air to the cargo storage space. Since the concentration of carbon dioxide in ambient air is relatively low, supply of ambient air to the cargo storage space will tend to decrease the level of carbon dioxide in the cargo storage space relatively quickly. In addition, since the concentration of oxygen in ambient air is relatively high, supply of ambient air to the cargo storage space will also tend to increase the level of oxygen in the cargo storage space. In the situation that the oxygen level is below the oxygen level setpoint range, the increase in oxygen level provided by supply of ambient air is beneficial. In the situation that the oxygen level is already in the oxygen level setpoint range, the increase in oxygen level is permitted because carbon dioxide level control is prioritised in the carbon dioxide priority logic.

If the carbon dioxide level is found to be above the carbon dioxide level setpoint range, the oxygen level is found to be above the oxygen level setpoint range, and the averaged respiration parameter is $R_1$ or $R_2$, the gas exchange module 8 is operated to supply nitrogen-enriched gas to the cargo storage space. In particular, if the averaged respiration parameter is $R_1$, the gas exchange module is operated in the first $N_2$ mode. And if the averaged respiration parameter is $R_2$, the gas exchange module is operated in the second $N_2$ mode. However, if the averaged respiration parameter is $R_3$, the gas exchange module is operated to supply ambient air to the cargo storage space. In this case, where the goods are respiring relatively quickly, supply of ambient air causes a more rapid decrease in the carbon dioxide level compared to introduction of nitrogen-enriched gas, despite a potential increase in oxygen level. The potential increase in oxygen level is acceptable because control of the carbon dioxide level is prioritised over control of the oxygen level in the carbon dioxide priority logic.

It will be apparent to the skilled person how to construct similar control logics which either prioritise oxygen level control or which attach equal weight to carbon dioxide and oxygen level control. For example, an oxygen priority control logic is shown in FIG. 8. In such a logic, if the oxygen level is found to be below the oxygen level setpoint range or below a minimum allowed level, the gas exchange module is operated to supply the cargo storage space with ambient air to increase the oxygen level. If the oxygen level is found to be within the oxygen level setpoint range, air in the cargo storage space is allowed to circulate passively, unless the carbon dioxide level is found to above the carbon dioxide level setpoint range and the averaged respiration parameter is $R_3$ (i.e. indicating quickly respiring goods), in which case the gas exchange module is operated in the second $N_2$ mode in order to supply the cargo storage space with nitrogen-enriched gas. The gas exchange module is also operated in the first $N_2$ mode to supply the cargo storage space with nitrogen-enriched gas if the oxygen level is found to be above the oxygen level setpoint range, unless the carbon dioxide level is also found to be above a maximum allowed level, in which case the gas exchange module is operated to supply the cargo storage space with ambient air to quickly reduce the carbon dioxide level.

Figure 9:
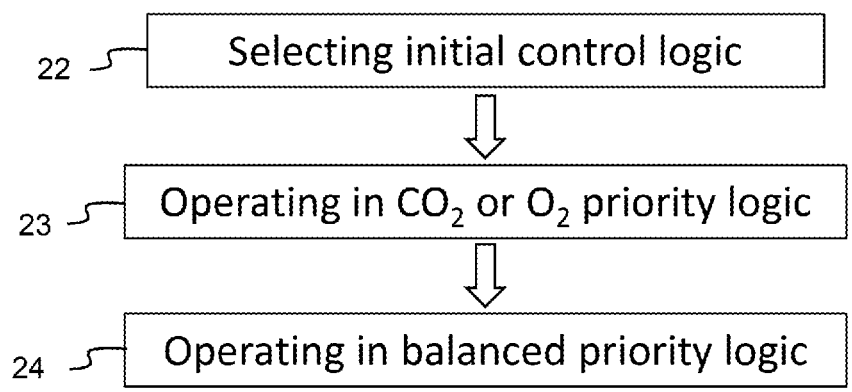
FIG. 9 is a flow chart illustrating a method of operating an active controlled atmosphere system.

In some implementations, the system will not necessarily remain in one particular control logic for the duration of transport of the goods. For example, as shown in FIG. 9, it may be that the control module 10: selects an initial control logic based on the input indicative of the goods being stored, such as a carbon dioxide priority logic or an oxygen priority logic (block 22); operates the controlled atmosphere system in the selected control logic (block 23); and then changes to a different control logic, for example to the balanced priority logic (block 24). For example, it may be that the control module 10: selects the carbon dioxide priority logic on the input indicative of the goods being stored (block 22); operates the controlled atmosphere system in the carbon dioxide priority logic (block 23); and, when the concentration of carbon dioxide in the cargo storage space is found to be in the carbon dioxide setpoint range, stops operating the controlled atmosphere system in the carbon dioxide priority logic and begins operating the controlled atmosphere system in the balanced priority logic (block 24).

Figure 10:
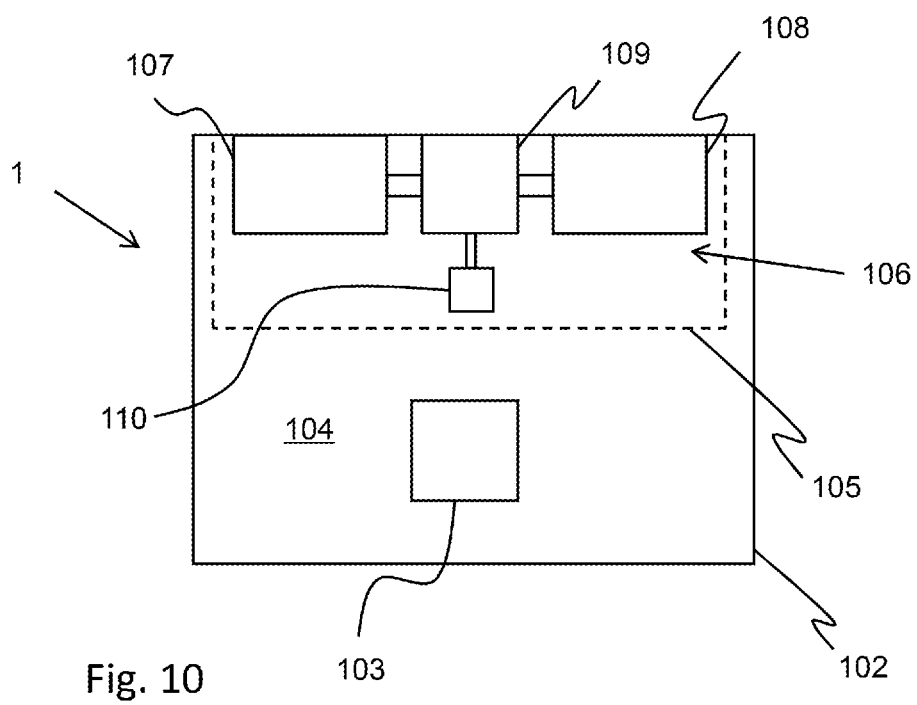
FIG. 10 is a plan view of a cargo storage space including stored goods and a passive controlled atmosphere system.

It will be appreciated that many aspects of the active controlled atmosphere system described above may be implemented in a passive controlled atmosphere system. For example, FIG. 10 shows schematically a transport container 101 comprising external walls 102 which separate an internal atmosphere of interior gas from an external atmosphere of exterior gas. Perishable goods 103 (such as a load of fresh fruit and/or vegetables) are provided in a cargo space 104 of the container.

A refrigeration module 105 is installed at one end of the container adjacent a wall 102 of the container. The refrigeration module 105 is in fluid communication with the interior of the cargo storage space 104 (as indicated by dashed line 105 demarcating the boundary of the refrigeration module 5) so as open to permit exchange of gas between the cargo space 104 and the refrigeration module 105.

The refrigeration module 105 includes a passive controlled atmosphere system 106. The controlled atmosphere system 106 includes an ambient air supply module 107 operable to open or close a fresh air vent to control influx of exterior gas from outside the container into the cargo storage space. In some implementations, the ambient air supply module is shared with the refrigeration circuit of the refrigeration module 105, although in other implementations the refrigeration circuit and the controlled atmosphere system each have separate ambient air supply modules. The controlled atmosphere system 106 also includes a carbon dioxide removal module 108 operable to remove carbon dioxide from gas extracted from the cargo storage space and consequently to supply a carbon dioxide-depleted gas back to the cargo storage space. In this implementation, the carbon dioxide removal module 108 includes an air mover such as a fan, a vent to the exterior of the container, a vent to the interior of the container, and a carbon dioxide gas separation membrane. The air mover is operable to pump gas extracted from the cargo storage space through the carbon dioxide gas separation membrane. The carbon dioxide gas separation membrane is selectively permeable to carbon dioxide, compared to nitrogen and oxygen, such that the membrane can be used to separate carbon dioxide from a flow of gas extracted from the cargo storage space. In alternative embodiments, however, the carbon dioxide removal module may include a carbon dioxide scrubber (containing, for example, carbon dioxide absorbing minerals, zeolites or activated carbon) rather than a carbon dioxide gas separation membrane.

In the passive controlled atmosphere system, the ventilation module may be operated to supply ambient air to the cargo space, typically causing a reduction in the carbon dioxide level in the cargo storage space along with an increase in the oxygen level, dependent on the starting levels of carbon dioxide and oxygen. In addition, the carbon dioxide removal module may be operated to remove carbon dioxide from the cargo storage space. There is therefore no module available to actively reduce the oxygen level in the cargo storage space, other than to allow oxygen levels to fall naturally due to respiration of the goods.

The controlled atmosphere system 106 includes a control module 109, similar to the control module 9 of the active system, operatively connected to both the ambient air supply module 107 and the carbon dioxide removal module 108.

The control module includes a processor configured to control operation of the air vent 102 and the carbon dioxide removal module 108. The controlled atmosphere system 106 further includes a sensor module 110, similar to the sensor module 10 of the active system, which includes an oxygen sensor and a carbon dioxide sensor operable to measure the levels of oxygen and carbon dioxide, respectively, in the cargo storage space. The control module 109 is operatively connected to the sensor module 110 for receiving measurements of the levels of oxygen and carbon dioxide in the cargo storage space. The sensor module 110 may also include other types of sensor, such as an ozone sensor or an ethylene sensor, and the control module 109 may receive measurements of, for example, the levels of ozone or ethylene in the cargo storage space.

As for the active system, the control module 110 of the passive system may be configured to control operation of the gas exchange modules (i.e. the vent module 107 and the carbon dioxide removal module 108) differently based on: the nature of the goods stored in the cargo storage space; the measured carbon dioxide and oxygen levels in the cargo storage space; and/or the determined respiration parameter, such as the averaged respiration parameter. For example, the control module 110 may be configured to operate the carbon dioxide removal module in different modes in which carbon dioxide is removed from the cargo storage space at different rates, dependent on the carbon dioxide and oxygen levels in the cargo storage space and/or the respiration parameter. As an example, it may be beneficial to operate the carbon dioxide removal module in a mode in which carbon dioxide is removed from the cargo storage space at a faster rate when the goods stored in the cargo storage space are respiring relatively quickly (i.e. such that the respiration parameter is relatively high).

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a controlled atmosphere (CA) system to regulate the atmosphere in a cargo storage space, the CA system comprising a gas exchange module operable to vary the level of a component gas in the cargo storage space, a control module to control operation of the gas exchange module, and at least one of an oxygen sensor and a carbon dioxide sensor, each being operable to measure a parameter indicative of a level of oxygen or carbon dioxide respectively in the cargo storage space, the method comprising:

the control module determining a respiration parameter value indicative of the rate of change of oxygen level and/or the rate of change of carbon dioxide level in the cargo storage space due to respiration of goods in the cargo storage space, wherein the respiration parameter value is determined from at least three predetermined respiration parameter values, each respiration parameter value corresponding to a respective range of rate of change of oxygen level and/or a respective range of rate of change of carbon dioxide level; and the control module controlling operation of the gas exchange module based on the determined respiration parameter value to target an oxygen level setpoint and/or a carbon dioxide level setpoint; and wherein the control module determining the respiration parameter value comprises:

the control module determining a rate of change of oxygen level and/or a rate of change of carbon dioxide level in the cargo storage space due to respiration of the goods in the cargo storage space; and the control module determining the respective respiration parameter value, from the at least three predetermined respiration parameter values, associated with the rate of change of oxygen level and/or the rate of change of carbon dioxide level.

2. The method according to claim 1, wherein the gas exchange module is operable in a plurality of different operational modes, and wherein the control module controlling operation of the gas exchange module comprises:

the control module selecting one of the operational modes based on the determined respiration parameter value; and the control module operating the gas exchange module in the selected operational mode to cause variation in the level of a respective component gas in the cargo storage space.

3. The method according to claim 2 comprising:

the control module determining the parameter indicative of the level of oxygen and/or the parameter indicative of the level of carbon dioxide in the cargo storage space;

the control module selecting one of the operational modes based on the parameter indicative of the level of oxygen and/or the parameter indicative of the level of carbon dioxide in the cargo storage space in addition to the determined respiration parameter value; and the control module operating the gas exchange module in the selected operational mode to cause variation in the level of a respective component gas in the cargo storage space.

4. The method according to claim 1, wherein the CA system comprises a plurality of different gas exchange modules and the method comprises:

the control module selecting one of the gas exchange modules to operate based on the determined respiration parameter value; and the control module operating the selected gas exchange module to cause variation in the level of a respective component gas in the cargo storage space.

5. The method according to claim 4 comprising:

the control module determining the parameter indicative of the level of oxygen and/or the parameter indicative of the level of carbon dioxide in the cargo storage space;

the control module selecting one of the gas exchange modules to operate based on the parameter indicative of the level of oxygen and/or the parameter indicative of the level of carbon dioxide in the cargo storage space in addition to the determined respiration parameter value; and the control module operating the selected gas exchange module to cause variation in the level of a respective component gas in the cargo storage space.

6. The method according to claim 1, wherein the control module is configured to operate the gas exchange module according to a plurality of different predetermined atmospheric control logics and the method comprises:

the control module selecting an operational atmospheric control logic from the plurality of different predetermined atmospheric control logics for atmospheric control of goods in the cargo storage space; and the control module controlling operation of the gas exchange module dependent on the selected operational atmospheric control logic and the determined respiration parameter value.

7. The method according to claim 1, wherein the CA system is a passive CA system and the gas exchange module is a carbon dioxide removal module operable to remove carbon dioxide from the atmosphere in the cargo storage space.

8. The method according to claim 7, wherein the CA system further comprises an ambient air supply module operable to supply ambient air to the cargo storage space.

9. The method according to claim 1, wherein the CA system is an active CA system and the gas exchange module is a nitrogen supply module operable to supply nitrogen rich gas to the atmosphere in the cargo storage space, the nitrogen-rich gas containing no less than 80% nitrogen gas by volume.

10. The method according to claim 9, wherein the CA system further comprises an ambient air supply module operable to supply ambient air to the cargo storage space.

11. The method according to claim 9, wherein the nitrogen supply module is operable to supply nitrogen to the atmosphere in the cargo storage space when operating in a nitrogen supply mode, and wherein the nitrogen supply module is operable to supply ambient air to the atmosphere in the cargo storage space when operating in an ambient air supply mode.

12. A controlled atmosphere (CA) system for regulating the atmosphere in a cargo storage space, the CA system comprising one or more gas exchange modules, an oxygen sensor operable to measure a parameter indicative of a level of oxygen in the cargo storage space and/or a carbon dioxide sensor operable to measure a parameter indicative of a level of carbon dioxide in the cargo storage space, and a control module configured to:

determine a respiration parameter value indicative of the rate of change of oxygen level and/or the rate of change of carbon dioxide level in the cargo storage space due to respiration of goods in the cargo storage space from at least three plurality of predetermined respiration parameter values, each respiration parameter value corresponding to a respective range of rate of change of oxygen level and/or a respective range of rate of change of carbon dioxide level; and control operation of the gas exchange module based on the determined respiration parameter value to target an oxygen level setpoint and/or a carbon dioxide level setpoint.

13. The CA system according to claim 12 installed in a freight container.

14. A non-transitory computer-readable medium storing instructions which, when executed by a processor of a controlled atmosphere (CA) system comprising one or more gas exchange modules and a control module, cause:

the control module to receive measurements of levels of oxygen and/or carbon dioxide in a cargo storage space;

the control module to determine a respiration parameter value indicative of the rate of change of oxygen level and/or the rate of change of carbon dioxide level in the cargo storage space due to respiration of goods in the cargo storage space from at least three plurality of predetermined respiration parameter values, each respiration parameter value corresponding to a respective range of rate of change of oxygen level and/or a respective range of rate of change of carbon dioxide level; and the control module to control operation of the gas exchange module based on the determined respiration parameter value to target an oxygen level setpoint and/or a carbon dioxide level setpoint.

\* \* \* \* \*